June 3, 1941.                E. AGHNIDES                2,244,280
                  CONNECTOR FOR TAPS, PIPES, AND THE LIKE
                           Filed Aug. 10, 1940
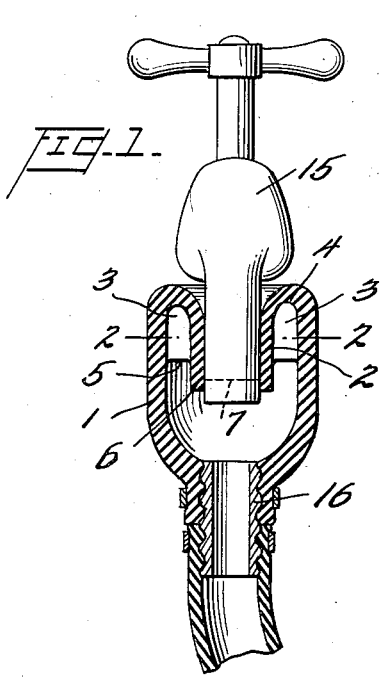
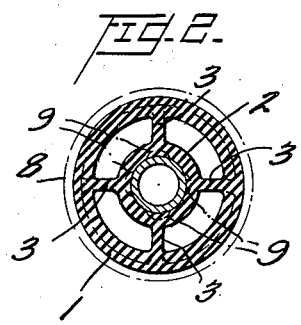
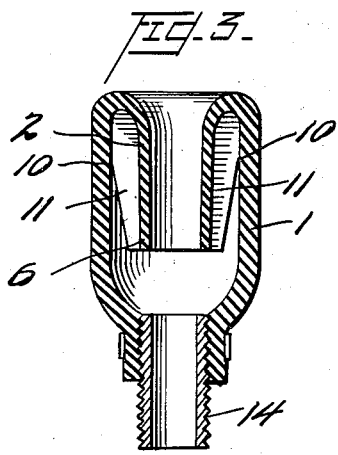
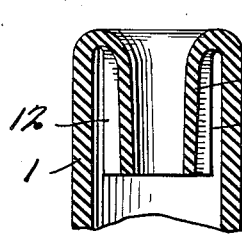
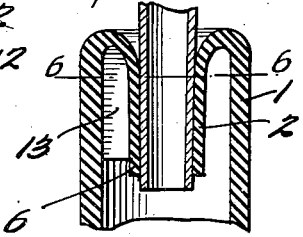
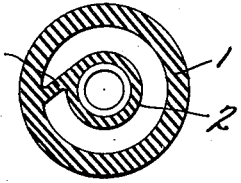
Inventor
Elie Aghnides
By John Boyle Jr.
Attorney Patented June 3, 1941

2,244,280

UNITED STATES PATENT OFFICE 2,244,280

CONNECTOR FOR TAPS, PIPES, AND THE LIKE

Elie Aghnides, New York, N. Y.

Application August 10, 1940, Serial No. 352,153

6 Claims. (Cl. 285—90)

My invention relates to soft rubber connectors for connection to taps, pipes or the like, of the type disclosed in my Reissue Patent 20,706 dated April 26, 1938, and which comprises an outer wall and an inner wall spaced from the outer wall, to provide a chamber for water under pressure. In order to prevent longitudinal displacement of the two walls of the connector relative to each other when the water pressure is on, I have connected the lower end of the inner wall to the outer wall and in some forms also at intermediate points.

In order to decrease the cost of manufacture, I have made the connection between the inner and outer wall in the form of integral webs or walls extending longitudinally of the axis of the connector, as disclosed in my application S. N. 304,408 filed Nov. 14, 1939, and of which this application is a continuation in part. As disclosed in the aforesaid application, there may be one or more integral radial elastic webs between the inner and outer walls. Instead of the web being radially disposed, there may be a plurality of webs tangentially disposed relative to the outer side of the inner wall but nevertheless extending longitudinally of the axis of the connector. One of the insufficiencies of devices having integral webs is that when connected to a faucet, particularly of oval section, they tend to leak between the faucet and inner wall of the connector and this is especially true with the type of connector where the webs are radially opposed to each other. In that type, as the outer wall expands under pressure, it pulls the web outwardly so that it draws the inner wall away from the faucet and causes leakage. This I overcome by leaving a circular portion of the inner wall disconnected from the outer wall and of such proportions and flexibility, so as to form a free belt that grips tightly around the discharge end of the faucet.

Referring to the drawing for a more complete disclosure of the invention

Fig. 1 is a vertical section through the preferred form of tap connector showing it in position on a faucet;

Fig. 2 is a section on the line 2—2 of Fig. 1, the dotted lines showing a diagrammatic form;

Fig. 3 is a vertical view in section of a modified form of tap connector;

Fig. 4 is a vertical view in section of another modified form;

Fig. 5 is a vertical view in section of a further modified form;

Fig. 6 is a section on the line 6—6 of Fig. 5.

Referring to Fig. 1, 1 is the outer wall and 2 the inner wall of the soft rubber connector. Integral with and formed in the molding operation are a plurality of radial webs 3 that extend about half way down from the top 4 of the connector to the point 5. This construction provides a free flexible end or band 6, to the inner wall of the connector. When the connector is attached to the faucet 15, the lower end of the faucet should be below the point 5 which is the bottom of the webs 3. While the faucet is shown extending beyond the free end 6, it will fulfill its purpose when the end is at the dotted line 7.

Referring now to Fig. 2, the operation will be better understood. When the water pressure expands the outer wall 1 to the dotted line position 8, it exerts a pull outward on all of the radial webs 3, with the result that it pulls the inner wall 2 away from the rigid faucet leaving spaces 9 through which the water seeps out. Since the free end 6 of the inner wall is disconnected from the webs 3 it remains tightly fitting around the end of the faucet, sealing the same against leaks between the inner wall and the faucet.

In the modified form shown in Fig. 3, the longitudinal webs 11 are connected to the outer wall from the top down, only to the point 10 but are connected to the inner wall to the free end 6 and serve to stiffen the inner free end and prevent longitudinal displacement of the inner and outer wall relative to each other.

In the modified form shown in Fig. 4, the webs 12 are not attached to the outer wall 1 but are integral with and extend the full length of the wall 2, stiffening the inner wall and preventing relative longitudinal displacement of the inner and outer wall. This form is recommended only for the lower water pressures or when the resistance offered to the flow of the fluid is not so great as to establish in the annular chamber a high pressure.

In the modified form shown in Fig. 5, there is a single tangential web 13. The pull on the inner wall 2 is less than with radially opposed ribs but the desired result is also obtained here with the free flexible end 6.

The tap connector can have molded into it a grooved coupling 16 or a screw coupling 14 for connection with a hose.

I claim:

1. A connector of the character described comprising an outer tube-like member, an inner tube-like member formed of flexible material such as rubber spaced from the outer member and connected thereto at one end to provide a chamber closed at one end and surrounding said inner member to form a fluid receiving space, means projecting in the chamber between the members to prevent longitudinal displacement of said members relative to each other, said inner member having at its free end, a zone free from connection to the outer member forming a single disconnected annular space and providing a belt for tightly gripping around a faucet to prevent leakage between the inner member and the faucet.

2. A connector of the character described formed of flexible material such as rubber comprising an inner tube-like member, an outer tube-like member, surrounding the inner member, the two members being in spaced relation to each other to provide a chamber closed at one end and open at the other end to admit fluid under pressure into the chamber, the outer member extending beyond the open end of the chamber to form a fluid passage, means projecting in the chamber between the members to prevent longitudinal displacement of said members relative to each other, said chamber having a zone, between which and the fluid passage, the inner member is free from connection to the outer member, forming a single disconnected annular space and providing a belt for tightly gripping around a faucet to prevent leakage between the inner member and the faucet.

3. A connector of the character described comprising an inner tube-like member formed of flexible material such as rubber, an outer tube-like member surrounding the inner member, the two members being in spaced relation with each other to provide a chamber closed at one end and open at the other end to admit fluid under pressure into the chamber, the outer member extending beyond the open end of the chamber to form a fluid passage, means in the chamber extending longitudinally of the axis to prevent longitudinal displacement of the members relative to each other, said chamber having a zone, between which and the fluid passage, the inner member is free from connection to the outer member, forming a single disconnected annular space and providing a belt for tightly gripping around a faucet to prevent leakage between the inner member and the faucet.

4. The device of claim 2 in which the means connect the outer and inner members and extend longitudinally of the axis from the upper end.

5. The device of claim 2 in which the means is a web connecting the inner and outer members and a free end of the inner member is located below said web forming a single disconnected annular space between said web and the fluid passage.

6. The device of claim 2 in which the means are radial webs connecting the inner and outer members and a free end of the inner member is located below said webs forming a single disconnected annular space between said webs and the fluid passage.

ELIE AGHNIDES